April 26, 1932.  J. A. ZUBLIN  1,855,330
METHOD OF IMPROVING THE WEAR RESISTANT QUALITIES OF A BODY
Filed Sept. 29, 1928
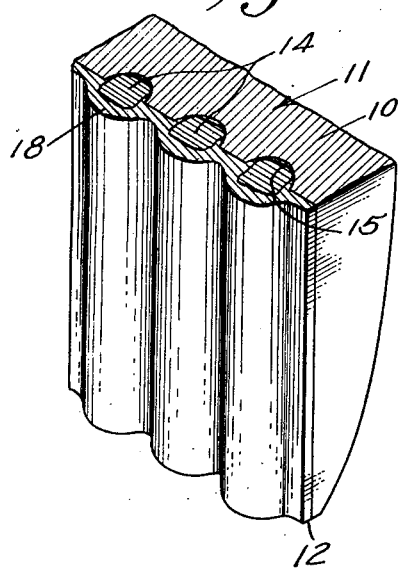
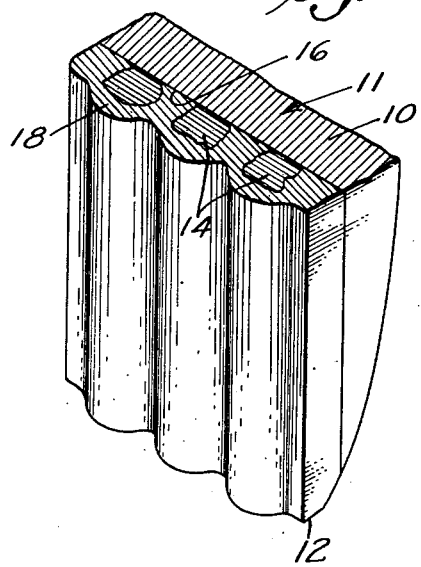
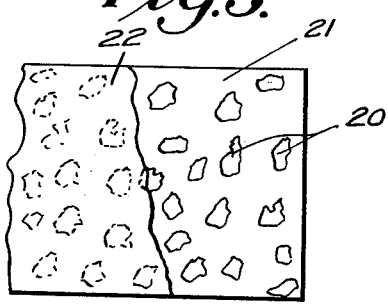
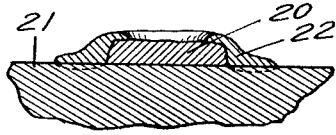
INVENTOR:
JOHN A. ZUBLIN,
By
Ford H. Harris
ATTORNEY Patented Apr. 26, 1932

1,855,330

UNITED STATES PATENT OFFICE

JOHN A. ZUBLIN, OF LOS ANGELES, CALIFORNIA, ASSIGNOR OF ONE-HALF TO CASPAR LEONID ZUBLIN AND ONE-HALF TO EDWARD ADOLPHUS ZUBLIN, BOTH OF LOS ANGELES, CALIFORNIA

METHOD OF IMPROVING THE WEAR-RESISTANT QUALITIES OF A BODY

Application filed September 29, 1928. Serial No. 309,248.

My invention relates to a method of improving the wear-resistant qualities of a body, and more particularly to a method of securing one or more pieces of wear-resistant material to a body in a manner to prevent the wearing away of this body.

My invention has been very successfully used in the oil-well drilling industry, and it is in this capacity that I shall particularly describe it without in any way limiting myself thereto.

It is customary to drill oil-wells either by means of a rotary or a percussion type of bit, this bit penetrating the strata in a manner to form a bore. The rotary method of drilling has many advantages over the percussion method, but it has been found that the bits used in the rotary method quickly become worn when penetrating hard strata. To eliminate this undue wear, these bits have been coated with certain substances such as "Stellite" or other hard material which may be melted by temperatures within the range of the ordinary welding torch, this material being welded to the body of the tool. Such a procedure increases the life of the bit, but still allows the cutting surfaces to wear away relatively quickly.

Another method of increasing the wear-resistant qualities of a body is to place one or more pieces of wear-resistant material adjacent that portion of the bit which receives the most wear, these pieces being held in place by a suitable supporting structure usually formed by welding a supporting material to the body of the bit. This method is particularly useful in securing diamond particles, or other pieces of material having extremely good wear-resistant qualities, in place. It is, of course, impossible to weld such diamond particles directly to the bit, and it becomes necessary instead to utilize a welded supporting structure for these diamond particles.

Certain metallic substitutes for diamond particles are at present on the market, these substitutes being extremely hard and incapable of becoming molten in the ordinary flame of an acetylene or electrical welding apparatus. These pieces of wear-resistant material are partially embedded in the welded supporting structure, as previously described, and are held in place only so long as the supporting structure remains intact. It has been found by actual test that these particles are not completely worn away, but rather that the supporting structure therefor wears or breaks, thus loosening the grip on the pieces of wear-resistant material and allowing these pieces to become separated from the bit.

The hardness of these pieces of wear-resistant material relative to the material utilized in the supporting structure is so different that the latter material wears off relatively rapidly, thus letting the pieces of wear-resistant material protrude more and more, and eventually wears to such a point that these pieces dislodge from their position on the bit.

I have discovered by extensive tests that it is possible to more than double the life of a bit by carefully heat-treating the supporting material forming the supporting structure for the pieces of wear-resistant material.

It is an object of this invention to provide a novel method of increasing the wear-resistant qualities of a body by welding a supporting material to this body in a manner to at least partially surround a piece of wear-resistant material, and subsequently to heat-treat this supporting material. This heat treatment refines the material forming the suppporting structure and makes this material harder and tougher so that it will not wear as fast as it would if not heat-treated.

Furthermore, due to the fact that the coefficient of expansion of the wear-resistant material is much less than that of the supporting material, this supporting material, when cooled, is subjected to internal stresses which cause an early failure thereof, thus allowing the wear-resistant material to become separated therefrom. By properly heat-treating this supporting material, these internal stresses are decreased or entirely eliminated, and from practical experience it has been found that the life of the bit, or other body to which the wear-resistant material is attached, is greatly increased.

It is an object of this invention to heat-treat a supporting material welded in place at least partially around a piece of wear-resistant material of different coefficient of expansion so that the internal stresses of the supporting material are reduced.

Another object of my invention is to provide a method of producing a combination including a body, a wear resisting piece secured to the body by a weld applied to the body in a manner to engage the wear resistant piece, in which the weld structure is caused to grip the wear resistant piece with maximum strength so as to hold same in working relationship to said body for a maximum period of time.

Further objects and advantages of this invention will be made evident hereinafter.

Referring to the drawing in which I have illustrated several embodiments of my invention,—

Fig. 1 illustrates one method of attaching a plurality of wear-resistant bars to a body.

Fig. 2 illustrates another method of accomplishing the same result.

Fig. 3 illustrates the wear-resistant pieces as being in small pieces and being held in place by a continuous sheet of supporting material welded in place.

Fig. 4 is a sectional view illustrating another method of holding these pieces in place.

In Fig. 1, I have illustrated a body 10, which is shown as comprising the extreme end of a tooth of a bit 11, this tooth having a cutting edge 12 adapted to be moved into contact with the strata to be penetrated by the bit. For the purpose of increasing the wearing qualities of the tooth, I provide a plurality of bars 14 which, in the embodiment shown, extend toward the cutting edge 12. In the form illustrated in Fig. 1, each of these bars is set in a groove 15, while in the form shown in Fig. 2 these bars are in direct contact with a surface 16 of the body 10.

The bars 14 are usually formed of a material having extremely good wear-resistant qualities. This material is almost invariably of the tungsten-carbide class and is ordinarily some form of metallic diamond substitute which is extremely hard and unaffected by the temperatures derived from an acetylene flame or from certain types of electrical welding apparatus. One material I have found very useful in this capacity is known to the trade as "Borium" which may be secured either in the form of sticks or in small broken pieces.

To hold the sticks 14 in place, a body of supporting material 18 is welded to the surface 16, this supporting material completely surrounding the sticks in the embodiment shown in Figs. 1 and 2. The body 10 is ordinarily formed of steel, and it is desirable to have the supporting structure, formed by the supporting material 18, of the same material. In this capacity I have found it advantageous to utilize high carbon steel as a supporting material.

Such a construction in itself is very effective in prolonging the life of the bit 11, but it has been observed that the useful life of the bit depends upon the holding ability of the supporting material. This material is much softer than the sticks 14 and thus wears out faster and exposes portions of the sticks 14, eventually becoming worn to such a point that the sticks will not be retained thereby. Similarily, it has been often observed that the sticks 14 become separated from the body 10 due to a cracking of the supporting material 18. This is due to the fact that the coefficient of expansion of the supporting material 18 is ordinarily much greater than that of the wear-resistant material in the sticks 14. Thus, when the supporting material 18 cools, after the sticks have been welded in place, high internal stresses remain in this supporting material. Furthermore, it is well-known that where the supporting structure is welded in place, the supporting material 18 of this structure is brittle and rather coarse in grain.

My invention comprehends the heat-treating of the supporting material 18 after this material has been welded in place on the body 10. By proper heat-treatment the grain of the supporting material becomes much finer and the internal stresses are relieved. So also, this material becomes harder and more wear-resistant.

One very important result of the process is that the final heat-treating step causes the supporting structure to grip the wear resistant pieces in a body of material having maximum resistance to breakage and abrasion under the severe treatment to which a tool of the character shown is subject. By my process the supporting structure is caused to tightly grip or pressurably engage the wear resistant pieces in such a manner that the wear resistant pieces cannot be dislodged or broken off by reason of the destruction of the supporting or securing welded metal.

The type of heat-treatment necessary is, of course, dependent upon the metal used in forming the supporting structure. As previously mentioned this metal is ordinarily a high carbon steel, and I have found the most effective treatment is obtained by heating the supporting structure to a temperature of about 1500° F. and quickly quenching in oil. Subsequently, it is sometimes desirable to draw the temper of this material by raising it to a temperature of substantially 1000° F.

It should be understood that I am not limited to the use of high carbon steel for forming this supporting structure. This structure may also be formed, for instance, from ordinary carbon steel or from low carbon nickel steel. A supporting structure formed of such materials often requires a carbonization prior to heat-treatment, this carbonization being performed in any one of a number of well-known methods.

In Figs. 3 and 4 I have illustrated small pieces of wear-resistant material 20 secured to a body 21 by means of a supporting material 22 welded to this body. This supporting material may completely cover the pieces 20 in the form of a sheet, as indicated in Fig. 3, or may simply encase or surround a portion of each piece 20, as illustrated in Fig. 4.

I claim as my invention:

1. A method of imparting wear-resistant qualities to a rotary well drilling tool structure of the character described, comprising: placing on said tool structure a piece of tungsten carbide; by a welding process building up a body of metal on said structure in a manner to engage said piece of tungsten carbide; and heat-treating said built up body of metal.

2. A method of imparting wear-resistant qualities to a drilling tool structure, which includes the steps of: placing on said tool structure a piece of material substantially harder than said tool structure, said piece of material containing carbon which is partly released during the welding operation; by a welding process building up a body of metal on said structure in a manner to engage said piece of material; and heat-treating said built up body of metal.

In testimony whereof, I have hereunto set my hand at Los Angeles, California, this 26th day of September, 1928.

JOHN A. ZUBLIN.